United States Patent
Lee et al.

(10) Patent No.: US 10,279,436 B2
(45) Date of Patent: *May 7, 2019

(54) FLUX-CORED ARC WELDING MATERIAL HAVING REMARKABLE IMPACT RESISTANCE AND ABRASION RESISTANCE

(71) Applicant: POSCO, Pohang-si (KR)

(72) Inventors: Bong-Keun Lee, Pohang-si (KR); Il-Wook Han, Pohang-si (KR); Jeong-Kil Kim, Pohang-si (KR); Sang-Chul Lee, Pohang-si (KR); Dong-Ryeol Lee, Pohang-si (KR); Geug Kim, Pohang-si (KR)

(73) Assignee: POSCO, Pohang-si (KR)

( * ) Notice: Subject to any disclaimer, the term of this patent is extended or adjusted under 35 U.S.C. 154(b) by 91 days.

This patent is subject to a terminal disclaimer.

(21) Appl. No.: 15/034,326

(22) PCT Filed: Oct. 2, 2014

(86) PCT No.: PCT/KR2014/009293
§ 371 (c)(1),
(2) Date: May 4, 2016

(87) PCT Pub. No.: WO2015/083930
PCT Pub. Date: Jun. 11, 2015

(65) Prior Publication Data
US 2016/0279742 A1    Sep. 29, 2016

(30) Foreign Application Priority Data
Dec. 6, 2013    (KR) .................. 10-2013-0151808

(51) Int. Cl.
| | | |
|---|---|---|
| B23K 35/30 | (2006.01) | |
| C22C 38/04 | (2006.01) | |
| B23K 35/36 | (2006.01) | |
| B23K 35/02 | (2006.01) | |
| B23K 35/362 | (2006.01) | |

(52) U.S. Cl.
CPC ...... B23K 35/3073 (2013.01); B23K 35/0266 (2013.01); B23K 35/361 (2013.01); B23K 35/362 (2013.01); B23K 35/3607 (2013.01); C22C 38/04 (2013.01)

(58) Field of Classification Search
CPC ............. B23K 35/30; B23K 35/3073; B23K 35/3607; B23K 35/3601; B23K 35/3608; B23K 35/3066; B23K 35/3086; B23K 35/304; B23K 35/3033

USPC ........ 219/74, 137 R, 145.22, 145.23, 146.1, 219/146.22, 146.23, 146.31, 146.32, 219/146.41

See application file for complete search history.

(56) References Cited

U.S. PATENT DOCUMENTS

| | | | |
|---|---|---|---|
| 7,393,597 B2 | 7/2008 | Ogawa et al. | |
| 2006/0219684 A1* | 10/2006 | Katiyar | B23K 35/3607 219/145.22 |
| 2010/0136361 A1 | 6/2010 | Osuki et al. | |

FOREIGN PATENT DOCUMENTS

| | | | |
|---|---|---|---|
| CN | 100445020 | 12/2008 | |
| CN | 101925436 | 12/2010 | |
| JP | 2003-136280 A * | 5/2003 | ............. B23K 35/30 |
| JP | 3856663 | 12/2006 | |
| JP | 4265604 | 5/2009 | |
| JP | 2009195980 | 9/2009 | |
| JP | 5218200 | 6/2013 | |
| KR | 20030050385 | 6/2003 | |
| KR | 100411477 | 12/2003 | |
| KR | 20090016854 | 2/2009 | |
| KR | 100925608 | 11/2009 | |
| KR | 20120111432 | 10/2012 | |
| KR | 20130003686 | 1/2013 | |

OTHER PUBLICATIONS

International Search Report—PCT/KR2014/009293 dated Jan. 9, 2015.

* cited by examiner

*Primary Examiner* — Phuong T Nguyen
(74) *Attorney, Agent, or Firm* — Cantor Colburn LLP

(57) ABSTRACT

Provided is a flux-cored arc welding material having remarkable impact resistance and abrasion resistance. The flux-cored arc welding material having remarkable impact resistance and abrasion resistance comprises: 0.1-0.75 wt % of C; 0.2-1.2 wt % of Si; 15-27 wt % of Mn; 2-7 wt % of Cr; 0.01 wt % or less of S; 0.018 wt % or less of P; 4.3-15 wt % of $TiO_2$; 0.01-9 wt % of at least one selected from the group consisting of $SiO_2$, $ZrO_2$ and $Al_2O_3$; and the balance of Fe and other inevitable impurities. Further provided are a welding joint capable of all-position welding and having remarkable weldability, low temperature impact toughness and abrasion resistance, and thus a welding material very preferably applied to the manufacture of pipes used in the oil sand industry field and the like.

6 Claims, No Drawings

FLUX-CORED ARC WELDING MATERIAL HAVING REMARKABLE IMPACT RESISTANCE AND ABRASION RESISTANCE

TECHNICAL FIELD

The present disclosure relates to a flux-cored arc welding material having high impact resistance and abrasion resistance.

BACKGROUND ART

Recent high oil prices have increased interest in methods of producing oil at low cost. Accordingly, techniques for separating crude oil in massive amounts have been developed, and there is increasing interest in the oil sands industry. The term "oil sands" was originally used to refer to sand or sandstone containing crude oil and is now used to refer to all kinds of rock such as sedimentary rock that exist in oil reservoirs and contain crude oil. Oil production methods of extracting crude oil from oil sands are relatively new methods, as compared to the existing oil production methods of extracting crude oil from oil wells, and are expected to undergo further development to reduce production costs.

However, oil sands generally contain large amounts of impurities together with crude oil. Therefore, an impurity removing process is performed when extracting crude oil from oil sands. After mining oil sands, the oil sands are transferred a certain distance to separation equipment so as to extract crude oil from the oil sands, and then separation pipes are used to separate impurities and crude oil from the oil sands. In the separation pipes, crude oil and impurities (such as rock, gravel, and sand) are rotated using water to allow the crude oil floating on the water to be collected. Basically, such pipes are required to have a high degree of strength. In addition, such pipes are required to have impact resistance and abrasion resistance, because rock and gravel contained in the pipes impact the interior surfaces of pipes, and are required to have impact toughness to withstand low-temperature environments, for example, environments in which temperatures can fall to −29° C. Particularly, welding joints are strictly required to have such properties because welding joints are weaker than base metals. The physical properties of base metals may be adjusted through processes such as heat treatment processes, rolling processes, or controlled cooling processes so that the base metals may have the highest abrasion resistance and impact toughness obtainable from the compositions of the base metals. However, welding joints are mainly formed of welding materials and have internal structures similar to that formed by a casting process. Thus, it may be difficult to impart desired physical properties to welding joints.

Currently, pipes widely used for mining oil sands are API X65, X70, etc., and welding materials allowing for all-position welding are required to connect such pipes in the field.

DISCLOSURE

Technical Problem

An aspect of the present disclosure may provide a welding material having low-temperature impact toughness and abrasion resistance in addition to having a high degree of weldability.

Technical Solution

According to an aspect of the present disclosure, a flux-cored arc welding material having high impact resistance and abrasion resistance may include, by wt %, carbon (C): 0.1% to 0.75%, silicon (Si): 0.2% to 1.2%, manganese (Mn): 15% to 27%, chromium (Cr): 2% to 7%, sulfur (S): 0.01% or less, phosphorus (P): 0.018% or less, $TiO_2$: 4.3% to 15%, at least one selected from the group consisting of $SiO_2$, $ZrO_2$, and $Al_2O_3$: 0.01% to 9%, and a balance of iron (Fe) and inevitable impurities.

Advantageous Effects

Embodiments of the present disclosure provide a welding material allowing for all-position welding and usable to form welding joints having a high degree of weldability, a high degree of low-temperature impact toughness, and a high degree of abrasion resistance. Thus, the welding material may be usefully used to manufacture pipes in the oil sands industry or the like.

BEST MODE

The inventors have conducted research into developing a welding material for forming welding joints having high degrees of low-temperature impact toughness and abrasion resistance in a process of welding high-manganese oil sands separation pipes designed to extract crude oil from oil sands. During the research, the inventors have found that if alloying elements of a welding material are properly adjusted, high weldability and the above-mentioned properties could be guaranteed, and have also found that welding materials suitable for all-position welding are those for flux-cored arc welding. Based on this knowledge, the inventors have invented the present invention.

Embodiments of the present disclosure will now be described. An exemplary embodiment of the present disclosure provides a flux-cored arc welding material having alloying elements described below. The flux-cored arc welding material of the exemplary embodiment includes a metal strip corresponding to a sheath of a welding wire, and a flux filled in the metal strip.

C: 0.1 wt % to 0.75 wt %

Carbon (C) is a powerful element effective in stabilizing austenite and thus guaranteeing the strength and low-temperature impact toughness of weld metal. If the content of carbon (C) is less than 0.1 wt %, austenite may not be formed, leading to poor toughness. Conversely, if the content of carbon (C) is greater than 0.75 wt %, gases such as carbon dioxide gas may be generated during a welding process to cause defects in welding joints, and carbon (C) may combine with alloying elements such as manganese (Mn) or chromium (Cr) and may form carbides such as MC or $M_{23}C_6$ to cause a decrease in low-temperature impact toughness. Therefore, it may be preferable that the content of carbon (C) be within the range of 0.1 wt % to 0.75 wt %.

Si: 0.2 wt % to 1.2 wt %

Silicon (Si) is added to remove oxygen from welding metal. IF the content of silicon (Si) is less than 0.2 wt %, the deoxidizing effect is insufficient, and weld metal may have low fluidity. Conversely, if the content of silicon (Si) is greater than 1.2 wt %, segregation may occur in weld metal, thereby causing a decrease in low-temperature impact toughness and having a negative effect on weld crack sensitivity. Therefore, it may be preferable that the content of silicon (Si) be within the range of 0.2 wt % to 1.2 wt %.

Mn: 15 wt % to 27 wt %

Manganese (Mn) increases work hardening and guarantees stable formation of austenite even at a low temperature. Thus, the welding material of the exemplary embodiment includes manganese (Mn). In addition, manganese (Mn) forms carbides together with carbon (C) and functions as an austenite stabilizing element like nickel (Ni). If the content of manganese (Mn) is less than 15 wt %, austenite may not be sufficiently formed, and thus low-temperature impact toughness may decrease. Conversely, if the content of manganese (Mn) is greater than 27 wt %, large amounts of fumes may be generated during welding, and abrasion resistance may decrease because slippage occurs instead of twining during plastic deformation. Therefore, it may be preferable that the content of silicon (Si) be within the range of 15 wt % to 27 wt %.

Cr: 2 wt % to 7 wt %

Chromium (Cr) is a ferrite stabilizing element, and the addition of chromium (Cr) enables decreasing the amounts of austenite stabilizing elements. In addition, chromium (Cr) facilitates the formation of carbides such as MC or $M_{23}C_6$. That is, if a certain amount of chromium (Cr) is added, precipitation hardening may be promoted, and the amounts of austenite stabilizing elements may be reduced. Thus, the addition of a certain amount of chromium (Cr) may be needed. In addition, since chromium (Cr) is a powerful anti-oxidation element, the addition of chromium (Cr) may increase resistance to oxidation in an oxygen atmosphere. If the content of chromium (Cr) is less than 2 wt %, the formation of carbides such as MC or $M_{23}C_6$ in welding joints may be suppressed, thereby decreasing abrasion resistance and increasing abrasion. Conversely, if the content of chromium (Cr) is greater than 7 wt %, manufacturing costs may increase, and abrasion resistance may steeply decrease. Therefore, it may be preferable that the content of chromium (Cr) be within the range of 2 wt % to 7 wt %.

S: 0.01 wt % or Less

Sulfur (S) is an impurity causing high-temperature cracking together with phosphorus (P), and thus it may be preferable that the content of sulfur (S) be adjusted to be as low as possible. Particularly, if the content of sulfur (S) is greater than 0.01 wt %, compounds having a low melting point such as FeS are formed, and thus high-temperature cracking may be induced. Therefore, preferably, the content of sulfur (S) may be adjusted to 0.01 wt % or less, so as to prevent high-temperature cracking.

P: 0.018 wt % or Less

Phosphorous (P) is an impurity causing high-temperature cracking, and thus it may be preferable that the content of phosphorus (P) be adjusted to be as low as possible. Preferably, the content of phosphorus (P) may be adjusted to be 0.018 wt % or less, so as to prevent high-temperature cracking.

$TiO_2$: 4.3 wt % to 15 wt %

Titanium dioxide ($TiO_2$) is a slag former solidifying before liquid weld metal solidifies, thereby preventing the liquid weld metal from flowing downward and allowing for all-position welding. To this end, it may be preferable that the content of $TiO_2$ be 4.3 wt % or greater. However, if the content of $TiO_2$ is greater than 15 wt %, the contents of oxides in weld metal may markedly increase, and low-temperature impact toughness may decrease. Therefore, it may be preferable that the content of $TiO_2$ be within the range of 4.3 wt % to 15 wt %.

At least one selected from the group consisting of $SiO_2$, $ZrO_2$, and $Al_2O_3$: 0.01 wt % to 9 wt %

If the content of at least one of $SiO_2$, $ZrO_2$, and $Al_2O_3$ is less than 0.01 wt %, the workability of all-position welding and the quality of weld beads may decrease because of poor application and separation of slag and unstable generation of arcs. Conversely, if the content of at least one of $SiO_2$, $ZrO_2$, and $Al_2O_3$ is greater than 9 wt %, the amount and viscosity of molten slag may markedly increase, thereby worsening all-position weldability and bead shapes. In addition, larger amounts of elements such as silicon (Si) or aluminum (Al) may be included in deposited metal, and thus impact toughness may decrease. Therefore, it may be preferable that the content of at least one of $SiO_2$, $ZrO_2$, and $Al_2O_3$ be within the range of 0.01 wt % to 9 wt %.

According to an exemplary embodiment of the present disclosure, the flux-cored arc welding material may include the above-described alloying elements and the balance of iron (Fe) and impurities inevitably added during manufacturing processes. Owing to the above-described alloying elements, the flux-cored arc welding material of the exemplary embodiment may have intended weldability and may be used to form welding joints having high impact resistance and abrasion resistance. Furthermore, in industrial sites, pipes may be easily welded by all-position welding using the flux-cored arc welding material of the exemplary embodiment. In addition to the above-described alloying elements, the flux-cored arc welding material of the exemplary embodiment may further include the following alloying elements. In this case, the properties of the flux-cored arc welding material may be further improved.

N: 0.5 wt % or Less

Nitrogen (N) improves corrosion resistance and stabilizes austenite. That is, the addition of nitrogen (N) leads to an effect similar to the effect obtainable by the addition of carbon (C). Therefore, nitrogen (N) may be added as a substitute for carbon (C). In addition, nitrogen (N) may be combined with other alloying elements and form nitrides which may particularly improve abrasion resistance. The above-described effects may be obtained even though nitrogen (N) is added in small amounts. If the content of nitrogen (N) is greater than 0.5 wt %, impact toughness may markedly decrease. Therefore, it may be preferable that the content of nitrogen (N) be 0.5 wt % or less.

Ni: 10 wt % or Less

Nickel (Ni) forms austenite by solid-solution strengthening and thus improves low-temperature toughness. Nickel (Ni) increases the toughness of welding joints by facilitating the formation of austenite, and thus welding joints having high hardness may not undergo brittle fracture. If the content of nickel (Ni) is greater than 10 wt %, although toughness markedly increases, abrasion resistance markedly decreases because of an increase in stacking fault energy. In addition, since nickel (Ni) is expensive, the addition of a large amount of nickel (Ni) is not preferred in terms of economical aspects. Therefore, it may be preferable that the content of nickel (Ni) be within the range of 10 wt % or less.

V: 5 wt % or Less

Vanadium (V) dissolves in steel and retards the transformation of ferrite and bainite, thereby promoting the formation of martensite. In addition, vanadium (V) promotes solid-solution strengthening and precipitation strengthening. However, the addition of an excessively large amount of vanadium (V) does not further increase the above-described effects but decreases toughness and weldability and increases manufacturing costs. Therefore, the content of vanadium (V) may preferably be 5 wt % or less.

Nb: 5 wt % or Less

Niobium (Nb) may increase the strength of welding joints by precipitation strengthening. However, the addition of an excessively large amount of vanadium (V), as well as increasing manufacturing costs, may cause the formation of coarse precipitates and may thus decrease abrasion resistance. Thus, the content of niobium (Nb) may preferably be 5 wt % or less.

Mo: 7 wt % or Less

Molybdenum (Mo) may increase the strength of welding joints by matrix solid-solution strengthening. Furthermore, like niobium (Nb) and vanadium (V), molybdenum (Mo) promotes precipitation strengthening. However, the addition of an excessively large amount of molybdenum (Mo) does not further increase the above-described effects but worsens toughness and weldability and increases steel manufacturing costs. Therefore, it may be preferable that the content of molybdenum (Mo) be within the range of 7 wt % or less.

W: 6 wt % or Less

Tungsten (W) may increase the strength of welding joints by matrix solid-solution strengthening. Furthermore, like niobium (Nb), vanadium (V), and molybdenum (Mo), tungsten (W) promotes precipitation strengthening. However, the addition of an excessively large amount of tungsten (W) does not further increase the above-described effects but worsens toughness and weldability and increases steel manufacturing costs. Therefore, it may be preferable that the content of tungsten (W) be within the range of 6 wt % or less.

At least one selected from the group consisting of K, Na, and Li: 0.01 wt % to 1.7 wt %

During welding, alkali metals such as potassium (K), sodium (Na), and lithium (Li) may decrease the ionization potential of arcs, and thus arcs may be easily generated and stably maintained. To this end, the content of at least one of potassium (K), sodium (Na), and lithium (Li) may preferably be 0.01 wt % or greater. However, if the content of at least one of potassium (K), sodium (Na), and lithium (Li) is greater than 1.7 wt %, fumes may be excessively generated during welding because of high vapor pressure.

At least one of F and Ca: 0.01 wt % to 1.5 wt %

During welding, fluorine (F) and calcium (Ca) react with hydrogen under high-temperature arc conditions, and thus diffusion hydrogen may be effectively reduced by dehydrogenation reaction. Thus, effects intended in the exemplary embodiment of the present disclosure may be more securely obtained. To this end, it may be preferable that the content of at least one of fluorine (F) and calcium (Ca) in a welding wire be within the range of 0.01 wt % or greater. However, if the content of at least one of fluorine (F) and calcium (Ca) is greater than 1.5 wt %, fumes may be excessively generated during welding because of high vapor pressure. In addition, the slag viscosity of a rutile-containing weld pool in which $TiO_2$ is contained as a main slag component may be excessively decreased, and thus beads may be unstably formed. Therefore, it may be preferable that the content of at least one of fluorine (F) and calcium (Ca) be within the range of 0.01 wt % to 1.5 wt %.

The welding material described according to the exemplary embodiment allows for all-position welding and has a high degree of weldability and a high degree of low-temperature impact toughness, for example, 27 J or greater at a temperature of −29° C. Furthermore, the welding material may be used to form welding joints having a high degree of abrasion resistance, for example, an abrasion amount of 2 g or less in an abrasion test according to American Society for Testing and Materials (ASTM) G65.

For example, the welding material of the exemplary embodiment may be used in the oil sands industry in which the above-described properties of the welding material are useful.

MODE FOR INVENTION

Hereinafter, embodiments of the present disclosure will be described more specifically through examples. However, the examples are for clearly explaining the embodiments of the present disclosure and are not intended to limit the scope of the present invention.

Flux-cored wires having the compositions illustrated in Tables 1 and 2 were manufactured, and pipes were manufactured by welding Hadfield steel parts using the flux-cored wires. The weldability, low-temperature impact toughness and abrasion resistance of welding joints of the pipes were measured as illustrated in Table 2. At that time, weldability was evaluated by observing the formation of cracks or pores. The weldability of welding joints having no cracks or pores was evaluated as being "good," and the weldability of welding joints having cracks or pores, or problems in separating slag was evaluated as being "poor." The abrasion resistance of the welding joints was evaluated by measuring abrasion amounts after performing an abrasion test according to American Society for Testing and Materials (ASTM) G65. API-X70 steel generally used in the oil industry has an abrasion amount of 2.855 g.

TABLE 1

| | Composition (wt %) | | | | | | | |
|---|---|---|---|---|---|---|---|---|
| Nos. | C | Mn | Si | Cr | S | P | $TiO_2$ | $SiO_2$ + $ZrO_2$ + $Al_2O_3$ |
| *IS1 | 0.25 | 23 | 0.5 | 3 | 0.01 | 0.01 | 6.8 | 0.01 |
| IS2 | 0.7 | 23 | 0.75 | 3 | 0.003 | 0.05 | 4.8 | 2 |
| IS3 | 0.1 | 15 | 0.2 | 3 | 0.01 | 0.012 | 15 | 6 |
| IS4 | 0.2 | 23 | 0.4 | 3 | 0.01 | 0.016 | 8.9 | 0.2 |
| IS5 | 0.1 | 25 | 0.5 | 3 | 0.01 | 0.012 | 12 | 8 |
| IS6 | 0.3 | 25 | 0.4 | 3 | 0.01 | 0.012 | 5.8 | 0.5 |
| IS7 | 0.3 | 25 | 0.2 | 3 | 0.01 | 0.012 | 5.8 | 0.5 |
| IS8 | 0.3 | 25 | 0.3 | 3 | 0.01 | 0.012 | 4.5 | 0.5 |
| IS9 | 0.3 | 23 | 0.4 | 3 | 0.01 | 0.01 | 6.3 | 1 |
| IS10 | 0.3 | 24 | 0.5 | 2 | 0.01 | 0.012 | 6.5 | 0.5 |
| IS11 | 0.3 | 22 | 0.2 | 7 | 0.01 | 0.01 | 4.5 | 0.5 |
| **CS1 | 0.1 | 15 | 0.2 | 3 | 0.01 | 0.02 | 13 | 4 |
| CS2 | 0.1 | 23 | 0.4 | 3 | 0.01 | 0.01 | 16 | 6 |
| CS3 | 0.3 | 23 | 0.4 | 3 | 0.01 | 0.01 | 4.5 | 0.5 |
| CS4 | 0.3 | 25 | 0.4 | 3 | 0.01 | 0.01 | 4.5 | 0.5 |
| CS5 | 0.3 | 23 | 0.4 | 3 | 0.005 | 0.012 | 4.3 | 0.5 |
| CS6 | 0.3 | 25 | 0.5 | 3 | 0.005 | 0.012 | 6.5 | 0.5 |
| CS7 | 0.02 | 25 | 0.6 | 3 | 0.01 | 0.012 | 4.1 | 0.2 |
| CS8 | 1.2 | 22 | 1.5 | 3 | 0.015 | 0.025 | 4 | 0.2 |
| CS9 | 0.3 | 25 | 0.4 | 3 | 0.01 | 0.012 | 17 | 1 |
| CS10 | 0.3 | 25 | 0.4 | 3 | 0.01 | 0.012 | 8.9 | 10 |
| CS11 | 0.3 | 25 | 0.4 | 3 | 0.01 | 0.012 | 2 | 1 |
| CS12 | 0.3 | 25 | 0.4 | 3 | 0.01 | 0.012 | 7 | 1 |
| CS13 | 0.3 | 25 | 0.4 | 3 | 0.01 | 0.012 | 7 | 1 |

*IS: Inventive Sample,
**CS: Comparative Sample

TABLE 2

| Nos. | Composition (wt %) | | | | | | | | Properties | |
|---|---|---|---|---|---|---|---|---|---|---|
| | N | Ni | V | Nb | Mo | W | K + Na + Li | F + Ca | Weldability | Impact toughness (@-29° C.) | Abrasion amount (g) |
| *IS1 | — | — | — | — | — | — | 0.3 | 0.2 | Good | 29 | 1.34 |
| IS2 | — | — | — | — | — | — | 0.01 | 0.01 | Good | 79 | 1.01 |
| IS3 | — | 10 | — | — | — | — | 1 | 1.2 | Good | 85 | 1.78 |
| IS4 | 0.1 | — | — | — | — | — | 0.5 | 0.3 | Good | 32 | 1.23 |
| IS5 | 0.25 | — | — | — | — | — | 1.5 | 0.5 | Good | 43 | 1.32 |
| IS6 | — | — | 4 | — | — | — | 0.2 | 0.2 | Good | 35 | 1.19 |
| IS7 | — | — | — | 4 | — | — | 0.2 | 0.2 | Good | 34 | 1.12 |
| IS8 | — | — | — | — | 7 | — | 0.1 | 0.1 | Good | 27 | 1.02 |
| IS9 | — | — | — | — | — | 4.5 | 0.3 | 0.3 | Good | 42 | 1.42 |
| IS10 | — | — | — | — | — | — | 0.2 | 0.3 | Good | 29 | 1.35 |
| IS11 | 0.01 | — | — | — | — | — | 0.1 | 0.1 | Good | 35 | 0.92 |
| **CS1 | — | 15 | — | — | — | — | 1 | 0.6 | Good | 89 | 2.09 |
| CS2 | — | — | — | — | — | — | 0.7 | 0.9 | Good | 18 | 0.82 |
| CS3 | — | — | 6 | — | — | — | 0.1 | 0.1 | Good | 25 | 1.04 |
| CS4 | — | — | — | 6 | — | — | 0.1 | 0.1 | Good | 21 | 1.01 |
| CS5 | — | — | — | — | 8 | — | 0.1 | 0.1 | Good | 19 | 0.92 |
| CS6 | — | — | — | — | — | 7 | 0.2 | 0.3 | Good | 26 | 1.52 |
| CS7 | 0.5 | — | — | — | — | — | 0.1 | 0.1 | Poor (pores) | — | — |
| CS8 | — | — | — | — | — | — | 0.1 | 0.1 | Poor (cracks) | — | — |
| CS9 | — | — | — | — | — | — | 0.1 | 0.1 | Poor (separation) | — | — |
| CS10 | — | — | — | — | — | — | 0.1 | 0.1 | Impossible to weld | — | — |
| CS11 | — | — | — | — | — | — | 0.1 | 0.1 | Impossible to weld | — | — |
| CS12 | — | — | — | — | — | — | 0.1 | 1.7 | Impossible to weld | — | — |
| CS13 | — | — | — | — | — | — | 1.5 | 0.1 | Impossible to weld | — | — |

*IS: Inventive Sample,
**CS: Comparative Sample

As illustrated in Tables 1 and 2 above, the welding joints formed of Inventive Samples 1 to 11 having compositions proposed in the exemplary embodiment of the present disclosure had a high degree of weldability, and a very high degree of impact resistance, that is, a low-temperature impact toughness of 27 J or greater at a temperature of −29° C. In addition, the abrasion amounts of the welding joints were 2 g or less. That is, the welding joints had high abrasion resistance compared to API-X70 steel of the related art.

However, Comparative Samples 1 to 13 not satisfying alloying element contents proposed in the exemplary embodiment of the present disclosure had low degrees of low-temperature impact toughness and abrasion resistance compared to the inventive samples. Particularly, Comparative Samples 7 to 9 had poor weldability. Thus, welding joints formed of Comparative Samples 7 to 9 had cracks or pores, or it was difficult to separate slag from the welding joints. In the case of Comparative Samples 10 to 13, it was difficult to perform welding because of unstable arcs or excessive amounts of spatters, and thus low-temperature impact toughness and abrasion resistance could not be evaluated.

The invention claimed is:

1. A flux-cored arc welding material, the welding material comprising: by wt %, carbon (C): 0.1% to 0.75%, silicon (Si): 0.2% to 1.2%, manganese (Mn): 15% to 27%, chromium (Cr): 2% to 7%, sulfur (S): 0.01% or less, phosphorus (P): 0.018% or less, $TiO_2$: 4.3% to 15%, at least one selected from the group consisting of $SiO_2$, $ZrO_2$, and $Al_2O_3$: 0.01% to 9%, and a balance of iron (Fe) and inevitable impurities, thereby being able to form a welding joint having an improved impact resistance and an improved abrasion resistance.

2. The flux-cored arc welding material of claim 1, further comprising: nitrogen (N) in an amount of 0.5% or less.

3. The flux-cored arc welding material of claim 1, further comprising: nickel (Ni) in an amount of 10% or less.

4. The flux-cored arc welding material of claim 1, further comprising: at least one selected from the group consisting of vanadium (V): 5% or less, niobium (Nb): 5% or less, molybdenum (Mo): 7% or less, and tungsten (W): 6% or less.

5. The flux-cored arc welding material of claim 1, further comprising: at least one selected from the group consisting of potassium (K), sodium (Na), and lithium (Li) in a total amount of 0.01% to 1.7%.

6. The flux-cored arc welding material of claim 1, further comprising: at least one of fluorine (F) and calcium (Ca) in a total amount of 0.01% to 1.5%.

* * * * *